Sept. 17, 1968  M. H. GOLDFOGEL ET AL  3,401,456
DENTAL IMPRESSION TRAY ASSEMBLY
Filed Jan. 17, 1966
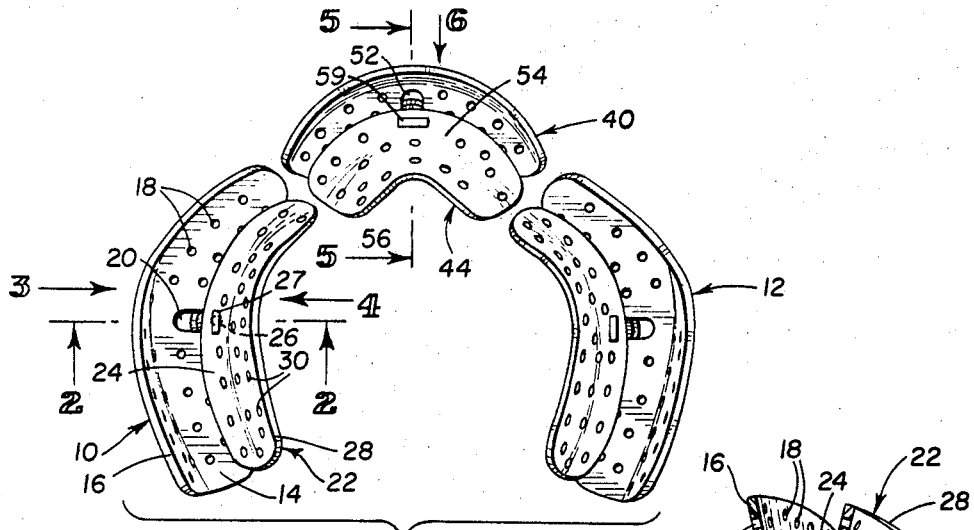
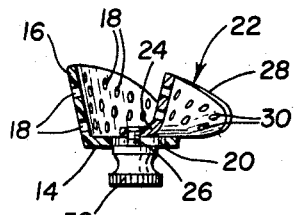
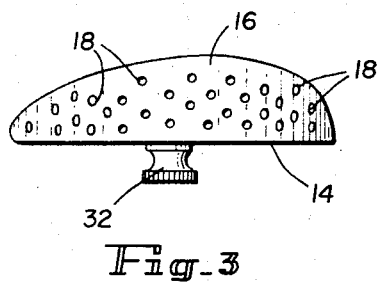
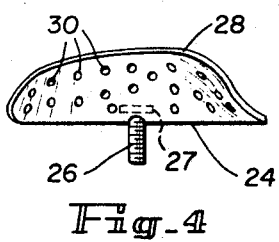
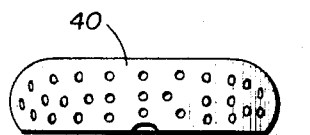
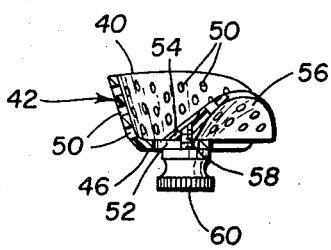
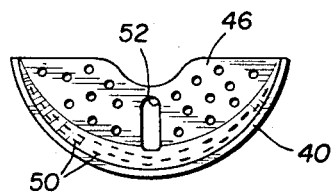
INVENTORS.
MARVIN H. GOLDFOGEL
LOUIS A. LABE
BY
ATTORNEYS › # United States Patent Office 3,401,456
Patented Sept. 17, 1968

3,401,456
DENTAL IMPRESSION TRAY ASSEMBLY
Marvin H. Goldfogel, 310 Leyden St. 80220, and
Louis A. Labe, 3076 Magnolia St. 80207, both
of Denver, Colo.
Filed Jan. 17, 1966, Ser. No. 521,011
5 Claims. (Cl. 32—17)

ABSTRACT OF THE DISCLOSURE

A dental impression tray assembly includes three units, each covering a sector or quadrant of a patient's mouth, and each including a base member with a planar portion in an arcuate upstanding wall. A movable member, having an arcuate upstanding wall forms an opposed wall of each unit, is connected to the adjacent base member by a single screw and nut assembly to permit a width adjustment between the upstanding walls and a pivotal adjustment of said movable member on said base member.

---

This invention relates to tray assemblies for obtaining dental impressions for use in constructing central models and more particularly to an anatomical tray assembly in which a dental impression of a patient's jaw is made in three sections to form three models, accurately made, specifically for operative dentistry, crown and bridge work.

One form of dental impression trays such as are now in general use are arranged to form a full impression of an entire jaw, either an upper or a lower impression. Since they are made to form a one piece impression of the entire jaw, such dental trays must be supplied in a wide variety of sizes in order to enable the dentist to make impressions of various sizes of jaw structures. Quadrant impression trays have, also, been suggested for making partial jaw impressions for dental models. These have not been wholly satisfactory.

It is therefore an object of the invention to provide an assembly which makes three separate impressions of three separate portions of a jaw structure from which a complete and accurate dental model may be made of any section of the upper or lower jaw. The assembly is arranged to fit various sizes and angles of the human mouth so that one assembly may be used for most sizes. Another object of the invention is to provide an assembly of dental impression trays each of which is arranged for accurate lateral and longitudinal adjustment to a particular portion of a jaw structure and the invention provides for adjustment to reduce the amount of impression material at the precise point of need to prevent internal distortions of the impression materials themselves. Another object of the invention is to provide a dental tray impression structure which is easily fitted in the mouth and adjusted while in position over the jaw structure, particularly it is adjustable to compensate for one or more teeth which may be in irregular positions.

These and other objects and advantages of the invention may be readily ascertained by referring to the following description and appended illustrations in which FIGURE 1 is an assembly view of three dental impression trays which are used to form three separate impression sections of a tooth and gum structure from which dental models may be made;

FIGURE 2 is a cross-sectional view of the left tray of the assembly taken along section line 2—2 of FIGURE 1;

FIGURE 3 is a side elevational view of the left tray of the assembly of FIGURE 1;

FIGURE 4 is a side elevational detailed view of the movable tray member of the left hand tray of FIGURE 1;

FIGURE 5 is a cross-sectional view of the front tray of the tray assembly of FIGURE 1 taken along section lines 5—5; and FIGURE 6 is a front elevational view of the base member of the front tray of the assembly of FIGURE 1;

FIGURE 7 is a top plan view of the base member of the front section of the tray assembly of FIGURE 1.

In general, each of the trays of the assembly comprises a base member having an arcuate planar base portion and an arcuate, generally upstanding, outwardly sloped wall. The base member has a plurality of small perforations for holding the dental impression material. The planar base is provided with an elongated slit approximately centerwise of the base. A movable member having a depending stud provides means for affixing the movable member to the base member. The movable member includes a narrow, planar, arcuate portion and an upstanding, outwardly sloped, arcuate wall. The wall of the movable member conforms generally to the shape of wall of the base member so as to form generally parallel arcuate walls.

The assembly shown in FIGURE 1 is used to take three different impressions, and as shown in the upright position is arranged to take an impression of the upper teeth of a person. Each of the individual trays is used for a partial mouth impression.

The left hand tray assembly, shown in general by numeral 10, is a mirror image of the right hand tray, shown in general by numeral 12. Tray assembly 10 includes a base member having a planar portion 14, which is generally arcuate along its longitudinal extent, and it includes an upstanding outwardly sloped wall 16 attached to the concave side or outside edge of the portion 14. The base member has a series of perforations 18 on both the upstanding wall 16 and on the planar portion 14. An elongated slit 20 is arranged approximately midway between the ends of the planar portion 14, and provides means to support and adjust movable tray member. The movable member includes a narrow, arcuate, planar portion 24 having a depending screw or stud 26. The portion 24 has an arcuate configuration approximating the curvature of the portion 14. An upstanding outwardly sloped wall 28 depends upwardly from the planar portion 24 and it has a curvature configuration approximately the same as the wall 16 so that a pair of approximately parallel walls is provided for forming an impression of a portion of the teeth and gums of a person. The movable tray member includes perforations 30 for holding the impression material. A nut 32 is threadedly engaged on the stud 26 provides means for tightening the movable member on the base member of the assembly. The stud has a diameter substantially less than the width of the slot which permits longitudinal movement as well as lateral movement along the slot of the movable member. In this manner the movable section may be placed in various positions in relation to the base narrowing or widening the distance between the walls. The movable member may, also, be pivoted changing the position of the movable member angularly in relation to the base 14. This permits change in thickness of impression material at prescribed positions. The tray section 12 is substantially a mirror image of the tray section 10, and both made in approximately the same manner and are used on opposite sides of the mouth.

The stud or screw 26 may be imbedded when the movable member is made of plastic and held in position. It may be attached by soldering, welding, etc. to the member when the member is made of metal. In a preferred form, however, a T head stud may be used which is removable, for convenience of cleaning, sterilizing, etc. The stud 26 includes a T head 27 which fits in a slot (not shown) in planar member 24. The slot keeps the stud from turning and provides a flush surface on the movable member.

The material for making the impression tray may be a rigid plastic which is at least rigid enough to hold its shape or it may be made of a metal such as aluminum, brass, stainless steel, etc., and in either case should be durable enough to be capable of being sterilized by most of the conventional means of sterilization. When made of a rigid plastic, it is light weight and is easily manipulated by the dentist. Also, being less than a full mouth impression tray it is more comfortable for the patient.

The holes or the perforations in the trays permits embedding of the impression material in the tray and assures that there be no slipping movement of the material in the tray when the impression material is pressed on the jaw of the user and withdrawn from the mouth.

The front tray section, shown in general by numeral 40, of the assembly is made in substantially the same manner, and it includes a base member (FIGURE 6) having a planar arcuate portion 46 and an arcuate, upstanding, outwardly sloped wall 46 extending upwardly from the concave section is approximately circular. The planar section and the upright wall are provided with perforations 50 and an elongated slot 52 for supporting a movable tray member as explained for the side tray members.

The movable member of the front tray includes a narrow, essentially planar portion 54 with an upstanding wall 56 depending upwardly and outwardly therefrom. The planar portion 54 is arcuate, conforming generally with the base portion of the tray and the arcuate wall conforms generally to the wall of the base to provide approximately parallel walls in order to fit the front portion of upper and lower teeth of a patient. The movable section is provided with a threaded T-head, stud 58 having a T head 59 for holding the movable section in position on the base member. The head of the stud fits in a slot and the threaded portion through the elongated opening 52 and a nut 60 releasably affixing the members together. The slot is wider than the diameter of the screw permitting it two way movement of the screw as well as rotation.

Any of the three tray sections may be made to fit the prescribed portion of the mouth of the patient by adjusting the movable section after the outer section has been placed in position in the mouth. The inner section is easily moved into proper position and tightened easily by the dentist while in the patient's mouth. Thus, the three sections provide a substantially universal fit for most patients. The type of nut makes it convenient to use as a handle for the tray, and the knurling makes it easy to hold.

The removable or fixed stud and the knurled nut are made of metal which provides a terminal point or connection when the impression is to be metal plated for making metal plated models. Also, the knurled nut makes a convenient and easily accessible handle for adjusting the tray when filled with impression material.

While the invention has been illustrated with reference to a particular embodiment, there is no intent to limit the spirit of the scope of the invention to precise details so set forth except as defined in the following claims.

We claim:
1. An assembly of sectional operative density impression trays comprising three separate, adjustable tray units, each unit covering a sector of a patient's mouth, the two side units of which are mirror images of each other and all three units are formed along generally an arcuate configuration, each unit including a base member having a planar portion and an arcuate upstanding and outwardly projecting wall section, each said wall section being curved along its longitudinal extent toward said planar portion; there being an elongated slot in said base portion normal to its longitudinal extent; a movable member arcuately curved along its longitudinal extent juxtaposed on each said base member, each said movable member having a narrow planar portion seated on each said planar portion and an upstanding and outwardly projecting wall depending from said planar portion of said movable member, said wall on said movable member being arcuate away from said planar portion and having an arcuate configuration to form approximately arcuate, parallel walls with said base member wall, releasable fastening means extending from each said elongated member through said slot for releasably joining the two parts together with the upstanding wall of said elongated member cooperatively forming with the wall of said base member an open ended arcuate tray, each said movable member being adjustable longitudinally toward and away from each said outwardly projecting wall and adjustable pivotally around said fastening means.

2. An assembly of impression trays according to claim 1 wherein each said base member and each said movable member includes a plurality of perforations to hold impression material during use.

3. An assembly of impression trays according to claim 2 wherein each said base member and each said movable member is a sufficiently rigid synthetic plastic to support impression material during use and to withstand one form of conventional sterilization.

4. An assembly of impression trays according to claim 1 wherein the radius of curvature of tray members for the side of the patient's jaw is a longer radius of curvature than the front tray member.

5. An assembly of impression trays according to claim 1 wherein said releasable fastening means is a T-head screw releasably mounted in the movable section of each tray and knurled nut provides means for adjustably connecting the base and movable members together.

References Cited

UNITED STATES PATENTS

| | | | |
|---|---|---|---|
| 755,670 | 3/1904 | Joannidi | 31—17 |
| 1,054,999 | 3/1913 | Thein | 32—17 |
| 1,512,686 | 10/1924 | Harper | 32—17 |
| 2,802,269 | 8/1957 | Stern | 32—17 |

LOUIS G. MANCENE, *Primary Examiner.*

R. PESHOCK, *Assistant Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,401,456            September 17, 1968

Marvin H. Goldfogel et al.

It is certified that error appears in the above identified patent and that said Letters Patent are hereby corrected as shown below:

Column 4, line 4, "density" should read -- dentistry --.

Signed and sealed this 17th day of February 1970.

(SEAL)
Attest:

Edward M. Fletcher, Jr.            WILLIAM E. SCHUYLER, JR.

Attesting Officer                  Commissioner of Patents